United States Patent
May et al.

(10) Patent No.: US 11,279,870 B2
(45) Date of Patent: *Mar. 22, 2022

(54) CAVITATION OF POLYMER-CONTAINING FLUIDS FOR USE IN SUBTERRANEAN FORMATIONS

(71) Applicant: Halliburton Energy Services, Inc., Houston, TX (US)

(72) Inventors: Preston Andrew May, Porter, TX (US); William Walter Shumway, Spring, TX (US); Dale E. Jamison, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 15 days.

This patent is subject to a terminal disclaimer.

(21) Appl. No.: 16/703,804

(22) Filed: Dec. 4, 2019

(65) Prior Publication Data

US 2021/0171825 A1 Jun. 10, 2021

(51) Int. Cl.
| C09K 8/68 | (2006.01) |
| C09K 8/88 | (2006.01) |
| B01D 21/28 | (2006.01) |
| E21B 21/06 | (2006.01) |

(52) U.S. Cl.
CPC ............ *C09K 8/885* (2013.01); *B01D 21/283* (2013.01); *C09K 8/882* (2013.01); *E21B 21/065* (2013.01)

(58) Field of Classification Search
CPC .......... C09K 8/885; C09K 8/882; C09K 8/40; C09K 8/64; C09K 8/68; C09K 8/725; C09K 8/82; C09K 8/88; C09K 8/02; C09K 2208/18; E21B 21/065; B01D 21/283
See application file for complete search history.

(56) References Cited

U.S. PATENT DOCUMENTS

| 3,497,005 A | 2/1970 | Pelopsky et al. |
| 5,129,468 A | 7/1992 | Parmenter |
| 5,246,684 A | 9/1993 | Brown et al. |
| 5,472,620 A * | 12/1995 | Huang ............... B01D 21/0009 208/188 |
| 5,766,478 A | 6/1998 | Smith et al. |
| 5,891,956 A | 4/1999 | Smith et al. |
| 6,269,880 B1 * | 8/2001 | Landry ................... E21B 37/00 166/105.5 |
| 7,144,512 B2 | 12/2006 | Qu et al. |
| 7,172,703 B2 | 2/2007 | Javora et al. |
| 7,201,225 B2 | 4/2007 | Smith et al. |
| 7,546,874 B2 | 6/2009 | Smith et al. |
| 7,674,384 B2 | 3/2010 | Javora et al. |
| 7,736,521 B2 | 6/2010 | Sloan et al. |
| 7,905,287 B2 * | 3/2011 | Oyler ................... C09K 8/508 166/300 |
| 8,123,953 B2 | 2/2012 | Gibbison |
| 9,005,686 B2 | 4/2015 | Bates et al. |
| 9,034,180 B2 | 5/2015 | McGuire |
| 9,215,891 B2 | 12/2015 | Nazir et al. |
| 9,249,478 B2 | 2/2016 | Harrison et al. |
| 9,644,126 B2 | 5/2017 | Harrison et al. |
| 2007/0114025 A1 * | 5/2007 | Smith ................... E21B 21/063 166/267 |
| 2009/0183922 A1 * | 7/2009 | Smith ................... E21B 21/068 175/66 |
| 2009/0220652 A1 | 9/2009 | Gardner et al. |
| 2009/0321260 A1 | 12/2009 | Andersen |
| 2010/0184630 A1 | 7/2010 | Sullivan et al. |
| 2011/0259761 A1 | 10/2011 | McGuire et al. |
| 2011/0269651 A1 * | 11/2011 | Bismarck ............. C09K 8/5083 507/225 |
| 2011/0278153 A1 | 11/2011 | Bates et al. |
| 2013/0112413 A1 | 5/2013 | Muthusamy et al. |
| 2014/0262228 A1 * | 9/2014 | Deville ................ C09K 8/467 166/249 |
| 2014/0263089 A1 * | 9/2014 | Agolli ....................... C02F 1/36 210/748.03 |
| 2014/0290957 A1 | 10/2014 | McGuire |
| 2014/0360945 A1 | 12/2014 | Vittur |
| 2016/0032176 A1 | 2/2016 | Jiang et al. |
| 2016/0160110 A1 * | 6/2016 | Miller ..................... C09K 8/50 507/137 |
| 2016/0289549 A1 * | 10/2016 | Nelson .................. C09K 8/035 |
| 2016/0356122 A1 | 12/2016 | Armstrong et al. |

(Continued)

FOREIGN PATENT DOCUMENTS

| EP | 0164225 A2 | 12/1985 |
| KR | 10-2010-0009968 A | 1/2010 |

(Continued)

OTHER PUBLICATIONS

Reference Guide downloaded on Mar. 22, 2021.*

(Continued)

*Primary Examiner* — Kumar R Bhushan

(74) *Attorney, Agent, or Firm* — Tenley Krueger; Baker Botts L.L.P.

(57) ABSTRACT

Methods for breaking polymer-containing treatment fluids for use in subterranean formations are provided. In one or more embodiments, the methods include providing a treatment fluid comprising a base fluid and a polymer, wherein the treatment fluid was recovered from at least a portion of a subterranean formation located at a wellsite; transporting the treatment fluid from the wellsite to an off-site location; and applying a cavitation technique to at least a portion of the treatment fluid at the off-site location.

18 Claims, 2 Drawing Sheets

(56) References Cited

U.S. PATENT DOCUMENTS

| | | |
|---|---|---|
| 2017/0136427 A1 | 5/2017 | Smith |
| 2018/0023376 A1* | 1/2018 | Davis .................... E21B 21/063 166/267 |
| 2019/0031793 A1 | 1/2019 | Smith |

FOREIGN PATENT DOCUMENTS

| | | |
|---|---|---|
| WO | 2004/092534 A1 | 10/2004 |
| WO | 2010/012032 A1 | 2/2010 |
| WO | 2010065603 A1 | 6/2010 |
| WO | 2017/083951 A1 | 5/2017 |

OTHER PUBLICATIONS

Pawar (I. A. Pawar et al., Ultrasound-based treatment approaches for intrinsic viscosity reduction of polyvinyl pyrrolidone (PVP), Ultrasonics Sonochemistry, 21, 2014, 1108-1116).*
International Search Report and Written Opinion issued in related PCT Application No. PCT/US2019/064675 dated Aug. 28, 2020, 14 pages.

\* cited by examiner

CAVITATION OF POLYMER-CONTAINING FLUIDS FOR USE IN SUBTERRANEAN FORMATIONS

BACKGROUND

The present disclosure relates to methods for breaking polymer-containing treatment fluids for use in subterranean formations.

Treatment fluids can be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, drilling, fracturing, competition, and the like.

For example, while drilling an oil or gas well, a drilling fluid (or drilling mud) is typically pumped down to a drill bit during drilling operations and flowed back to the surface through an annulus defined between a drill string and the walls of the wellbore. Drilling fluids often include viscosifiers to, for example, improve the ability of the drilling fluid to remove cuttings from the wellbore and suspend cuttings.

Drill-in fluids are specially designed for drilling through a subsurface hydrocarbon reservoir portion of a wellbore. Such fluids are generally formulated to minimize formation damage and maximize production of the zones exposed by the drilling. Like drilling fluids, drill-in fluids generally include polymers for providing viscosity, suspension, and fluid loss control.

Many polymers used in drilling fluids, drill-in fluids, and other subterranean treatment fluids have been designed to be stable under the extreme conditions of subterranean formations, such as high temperatures and high pressures. After the desired application of a treatment fluid has been achieved, it is often desirable to reduce the viscosity of the fluid. Reducing the viscosity of a fluid may be referred to as "breaking" the fluid. Breaking of fluids has been accomplished using chemical breakers. However, the robust nature of the polymers typically used in high temperature drilling and drill-in fluids may be difficult to break with certain chemical breakers, particularly at the surface at relatively low temperatures and pressures.

BRIEF DESCRIPTION OF THE DRAWINGS

These drawings illustrate certain aspects of some of the embodiments of the present disclosure and should not be used to limit or define the claims.

Figure 1:
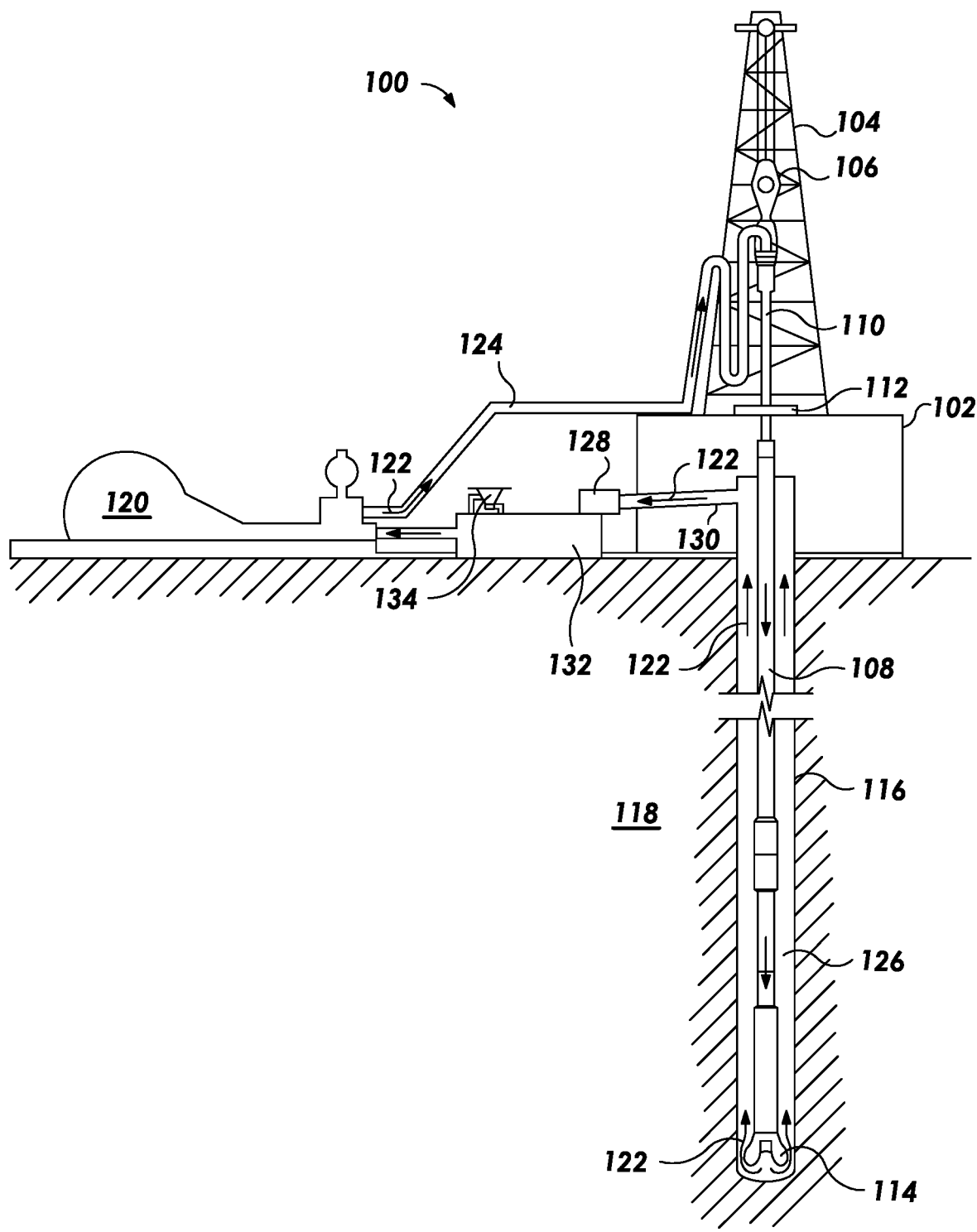
FIG. 1 is a diagram illustrating an example of a drilling assembly that may be used in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those of ordinary skill in the pertinent art and having the benefit of this disclosure. The depicted and described embodiments of this disclosure are examples only, and not exhaustive of the scope of the disclosure.

DESCRIPTION OF CERTAIN EMBODIMENTS

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming but would nevertheless be a routine undertaking for those of ordinary skill in the art having the benefit of the present disclosure.

The present disclosure relates to methods for breaking polymer-containing treatment fluids for use in subterranean formations. More specifically, the present disclosure provides methods for breaking polymer-containing treatment fluids for use in subterranean formations using cavitation to reclaim or recycle the base fluids of the treatment fluids. In certain embodiments, the methods of the present disclosure include providing a treatment fluid including a base fluid and at least one polymer and cavitating at least a portion of the treatment fluid with one or more cavitation devices to at least partially reduce the viscosity and/or suspension properties of the treatment fluid. In some embodiments, the treatment fluid may also include (e.g., have suspended therein) at least one solid, such as a bridging agent. In certain embodiments, the treatment fluids used in the methods of the present disclosure may be used or have been used to treat a subterranean formation (e.g., as a drilling fluid or a drill-in fluid) prior to cavitation. In certain embodiments, the treatment fluids used in the methods of the present disclosure may be removed from at least a portion of subterranean formation prior to cavitation. In certain embodiments, the methods of the present disclosure also may include applying a separation or removal technique to the treatment fluid to substantially separate the base fluid of the treatment fluid from the other components of the treatment fluid (e.g., solid particulates).

Those of ordinary skill in the art having the benefit of the present disclosure will appreciate the types of treatment fluids including a base fluid and one or more polymers disclosed herein that may be used in accordance with the methods of the present disclosure. Examples of such treatment fluids include, but are not limited to, drill-in fluids, drilling fluids, completion fluids, workover fluids, fracturing fluids, acidizing fluids, suspension fluids, breaker fluids, packer fluids, logging fluids, spacer fluids, transition fluids, and the like. In certain embodiments, the treatment fluids of the present disclosure may include any base fluid known in the art, including aqueous base fluids, non-aqueous base fluids, and any combinations thereof. The term "base fluid" refers to the major component of the fluid (as opposed to components dissolved and/or suspended therein) and does not indicate any particular condition or property of that fluids such as its mass, amount, pH, etc. Examples of non-aqueous fluids that may be suitable for use in the methods and systems of the present disclosure include, but are not limited to, oils, hydrocarbons, organic liquids, and the like. In certain embodiments, the base fluid may be an oil-in-water emulsion or a water-in-oil emulsion.

Aqueous base fluids that may be suitable for use in the methods of the present disclosure may include water from any source. Such aqueous base fluids may include fresh water, salt water (e.g., water containing one or more salts dissolved therein), brine (e.g., saturated salt water), seawater, or any combination thereof. In some embodiments, the aqueous base fluids may include one or more ionic species, such as those formed by salts dissolved in water. For example, seawater and/or produced water may include a variety of divalent cationic species dissolved therein. The ionic species may be any suitable ionic species known in the art. In certain embodiments, the ionic species may be one or more salts selected from the group consisting of: sodium chloride, sodium bromide, sodium iodide, sodium acetate, sodium formate, sodium citrate, potassium chloride, potassium formate, potassium iodide, potassium bromide, calcium chloride, calcium nitrate, calcium bromide, calcium iodide, magnesium chloride, magnesium bromide, magnesium sulfate, cesium formate, zinc chloride, zinc bromide, zinc iodide, and any combination thereof. In certain embodiments, the density of the aqueous base fluid can be adjusted to, among other purposes, provide additional particulate transport and suspension. In certain embodiments, the pH of the aqueous base fluid may be adjusted (e.g., by a buffer or other pH adjusting agent) to a specific level, which may depend on, among other factors, the types of clays, acids, and other additives included in the fluid. One of ordinary skill in the art with the benefit of this disclosure will recognize when such density and/or pH adjustments are appropriate.

In certain embodiments, the treatment fluids of the present disclosure may include one or more polymers. In certain embodiments, the polymers used in the methods of the present disclosure may have a molecular weight equal to or greater than about 30,000 g/mol. The polymers that may be suitable for use in the treatment fluids and methods of the present disclosure include any polymer that is capable of increasing the viscosity, suspension, and/or filtration control of a fluid. In certain embodiments, the polymers used in the treatment fluids of the present disclosure may be a naturally-occurring polymer (or derived therefrom), a synthetic polymer, and/or combinations thereof. Examples of polymers that may be suitable for use in the treatment fluids and methods of the present disclosure include, but are not limited to, guar, guar derivatives (e.g., hydroxyethyl guar, hydroxypropyl guar, carboxymethyl guar, carboxymethylhydroxyethyl guar, and carboxymethylhydroxypropyl guar ("CMHPG")), cellulose, cellulose derivatives (e.g., hydroxyethyl cellulose, carboxyethylcellulose, carboxymethylcellulose, and carboxymethylhydroxyethylcellulose), biopolymers (e.g., xanthan, scleroglucan, diutan, welan gum, alginate, etc.), starches, starch derivatives (e.g., carboxymethyl starch), poly(styrene-butadiene), poly(styrene-acrylate), poly(styrene-sulfonate), polyethylene, polypropylene, polyethylene glycol, polypropylene glycol, polyvinyl alcohol, polyvinylchloride, polylactic acid, polyacrylamide, polyvinylpyrrolidone, poly(2-acrylamido-2-methyl-1-propanesulfonic acid), polyacrylate, partially hydrolyzed polyacrylate, polysulfone (PSU), poly(ethersulfone) (PES), polyetherimide (PEI), poly(phenylene sulfide) (PPS), polyetheretherketone (PEEK), polyether ketones (PEK), fluoropolymers, polyethylene glycol, polypropylene glycol, any homopolymers thereof, any copolymers thereof, any tetrapolymers thereof, any crosslinked versions thereof, and/or combinations thereof. Examples of polymers that may be suitable for use in the treatment fluids and methods of the present disclosure include a xanthan polymer commercially available from Halliburton Energy Services, Inc., of Houston, Tex., under the trade name "N-VIS®;" a hydroxyethyl cellulose polymer commercially available from Halliburton Energy Services, Inc., of Houston, Tex., under the trade name "LIQUI-VIS® EP;" and a crosslinked starch polymer commercially available from Halliburton Energy Services, Inc., of Houston, Tex., under the trade name "N-DRIL™ HT PLUS™." In certain embodiments, the polymers may be "crosslinked" with a crosslinking agent to, among other reasons, impart enhanced viscosity and/or suspension properties to the fluid.

In certain embodiments, other breaking techniques (such as applying heat or adding a chemical breaker) may not substantially break the polymers used in the treatment fluids and methods of the present disclosure. In certain embodiments, the polymers used in the methods of the present disclosure may withstand temperature above about 350° F. for over 30 days without substantially breaking. As used herein, the term "substantially" means that at least about 50%, 60%, 70%, 80%, 90%, 95%, 96%, 97%, 98%, 99%, 99.5%, 99.9%, 99.99%, alternatively at least about 99.999% or more, of the polymer remains unbroken. Examples of such polymers that do not substantially break under increased temperature and/or using chemical breakers include, but are not limited to, poly(styrene-acrylate), poly(styrene-sulfonate), polyethylene, polypropylene, polyethylene glycol, polypropylene glycol, polyvinyl alcohol, polyvinylchloride, polyvinylpyrrolidone, poly(2-acrylamido-2-methyl-1-propanesulfonic acid), polyacrylate, partially hydrolyzed polyacrylate, polysulfone (PSU), poly(ethersulfone) (PES), polyetherimide (PEI), poly(phenylene sulfide) (PPS), polyetheretherketone (PEEK), polyether ketones (PEK), fluoropolymers, any derivative thereof, and any combination thereof. Thus, in certain embodiments, cavitation may be necessary to break these polymers.

The polymers may be included in any amount sufficient to impart the desired viscosity, suspension, and/or filtration control properties to the fluid. In certain embodiments, the one or more polymers may be included in an amount of from about 0.1 pounds per barrel (lb/bbl) of the treatment fluid to about 20 lb/bbl of the treatment fluid. In other embodiments, the one or more polymers may be included in an amount of from about 1 lb/bbl of the treatment fluid to about 15 lb/bbl of the treatment fluid. In other embodiments, the one or more polymers may be included in an amount of from about 2 lb/bbl of the treatment fluid to about 10 lb/bbl of the treatment fluid. In other embodiments, the one or more polymers may be included in an amount of from about 0.5 lb/bbl of the treatment fluid to about 5 lb/bbl of the treatment fluid. In other embodiments, the one or more polymers may be included in an amount of from about 1 lb/bbl of the treatment fluid to about 8 lb/bbl of the treatment fluid.

In other embodiments, the one or more polymers may be included in an amount of less than about 20 lb/bbl. In other embodiments, the one or more polymers may be included in an amount of less than about 15 lb/bbl. In other embodiments, the one or more polymers may be included in an amount of less than about 12 lb/bbl. In other embodiments, the one or more polymers may be included in an amount of less than about 10 lb/bbl. In other embodiments, the one or more polymers may be included in an amount of less than about 8 lb/bbl.

In certain embodiments, the treatment fluids of the present disclosure may include one or more lost circulation materials or bridging agents. In certain embodiments, lost circulation materials or bridging agents may include, but are not limited to, BARACARB® particulates (ground marble, available from Halliburton Energy Services, Inc.) including BARACARB® 5, BARACARB® 25, BARACARB® 50, BARACARB® 150, BARACARB® 600, BARACARB® 1200; STEELSEAL® particulates (resilient graphitic carbon, available from Halliburton Energy Services, Inc.) including STEELSEAL® powder, STEELSEAL® 50, STEELSEAL® 150, STEELSEAL® 400 and STEEL-SEAL® 1000; WALL-NUT® particulates (ground walnut shells, available from Halliburton Energy Services, Inc.) including WALL-NUT® M, WALL-NUT® coarse, WALL-NUT® medium, and WALL-NUT® fine; BARAPLUG® (sized salt water, available from Halliburton Energy Services, Inc.) including BARAPLUG® 20, BARAPLUG® 50, and BARAPLUG® 3/300; BARAFLAKE® (calcium carbonate and polymers, available from Halliburton Energy Services, Inc.); acid soluble bridging solids including magnesium and calcium carbonate, limestone, marble, dolomite, iron carbonate, iron oxide, calcium oxide, magnesium oxide, perborate salts and the like; and any combination thereof.

In certain embodiments, the treatment fluids of the present disclosure may include any number of additives. Examples of such additives include, but are not limited to, salts, surfactants, acids, diverting agents, fluid loss control additives, gas, nitrogen, carbon dioxide, surface modifying agents, tackifying agents, foamers, corrosion inhibitors, scale inhibitors, catalysts, clay stabilizers, shale inhibitors, biocides, friction reducers, antifoam agents, additional bridging agents, flocculants, $H_2S$ scavengers, $CO_2$ scavengers, oxygen scavengers, lubricants, hydrocarbons, additional viscosifying/gelling agents, breakers, weighting agents, relative permeability modifiers, resins, wetting agents, coating enhancement agents, filter cake removal agents, antifreeze agents (e.g., ethylene glycol), particulates, and the like. A person skilled in the art, with the benefit of this disclosure, will recognize the types of additives that may be included in the treatment fluids of the present disclosure for a particular application. In certain embodiments, the treatment fluids used in the methods of the present disclosure may be used or have been used to treat a subterranean formation (e.g., as a drilling fluid or drill-in fluid).

Thus, the treatment fluids may also include solid particulates, such as lost circulation materials, bridging agents, solid breakers, internal breakers, proppant, solid alkalinity control agents, solids from the subterranean formation (e.g., rock fragments generated by the drill bit during drilling), and any combination thereof. In certain embodiments, the size of the solid particulates may be in the range from about 0.1 micron to about 100 microns. In other embodiments, the size of the solid particulates may be in the range from about 1 micron to about 200 microns. In other embodiments, the size of the solid particulates may be in the range from about 2 microns to about 600 microns. In other embodiments, the size of the solid particulates may be in the range from about 5 microns to about 600 microns. In other embodiments, the size of the solid particulates may be in the range from about 25 microns to about 400 microns. In other embodiments, the size of the solid particulates may be in the range from about 2 microns to about 1200 microns.

In certain embodiments, the methods of the present disclosure include applying a cavitation technique to at least a portion of the treatment fluids of the present disclosure. In one or more embodiments, applying a cavitation technique to the treatment fluids may cause the formation of cavities (e.g., "bubbles" or "voids") in the treatment fluid (e.g., direct cavitation) or another fluid in proximity to the treatment fluid (e.g., indirect cavitation) that may collapse and generate a shock wave. In certain embodiments, the shock wave may have sufficient energy to at least partially break (e.g., via chain scission) the polymer. Thus, applying a cavitation technique to the treatment fluids of the present disclosure may at least partially reduce the viscosity and/or suspension properties of the treatment fluids by at least partially "breaking" the polymer in the fluid.

In certain embodiments, the treatment fluid may have a density from about 7 lb/gal to about 18 lb/gal prior to applying the cavitation technique to the fluid. In other embodiments, the treatment fluid may have a density from about 8 lb/gal to about 17 lb/gal prior to applying the cavitation technique to the fluid. In other embodiments, the treatment fluid may have a density from about 12 lb/gal to about 16 lb/gal prior to applying the cavitation technique to the fluid. In certain embodiments, applying a cavitation technique to the treatment fluid does not substantially alter (increase or decrease) the density of the fluid. In certain embodiments, applying a cavitation technique to the treatment fluid does not substantially alter (increase or decrease) the moisture content of the fluid. In some embodiments, applying a cavitation technique to the treatment fluid does not substantially concentrate the treatment fluid. As used herein, the term "moisture content" refers to the quantity of the base fluid in the treatment fluid. As used herein, the term "substantially" means that the density and/or the moisture content of the fluid remains at least about 50%, 60%, 70%, 80%, 90%, 95%, 96%, 97%, 98%, 99%, 99.5%, 99.9%, 99.99%, alternatively at least about 99.999% or more, of the original value. In certain embodiments, the treatment fluid may have a density from about 7 lb/gal to about 18 lb/gal after applying the cavitation technique to the fluid. In other embodiments, the treatment fluid may have a density from about 8 lb/gal to about 17 lb/gal after applying the cavitation technique to the fluid. In other embodiments, the treatment fluid may have a density from about 12 lb/gal to about 16 lb/gal after applying the cavitation technique to the fluid.

In certain embodiments, one or more cavitation techniques may be applied to the treatment fluids of the present disclosure. Examples of cavitation techniques that may be suitable for use in the methods of the present disclosure include, but are not limited to, hydrodynamic cavitation, ultrasonic induced cavitation (e.g., via sonication), and any combination thereof. Examples of cavitation devices that may be suitable for use in the methods of the present disclosure include, but are not limited to, hydrodynamic cavitation devices, centrifugal pumps, marine propellers, water turbines, ultrasonic probes, ultrasonic horns, ultrasonic vibrators, ultrasonic homogenizers, flow-through sonication devices, and any combination thereof. Those of ordinary skill in the art having the benefit of the present disclosure will appreciate such devices may be modified to induce and/or increase cavitation by, for example, including lowering the viscosity of the fluid (e.g., with chemicals and/or heat), adding low pressure regions to the cavitation device (e.g., near impellers or propellers), increasing the pressure in the cavitation device, increasing the flowrate of the treatment fluid through the device and/or the speed of the device, and any combination thereof. Those of ordinary skill in the art having the benefit of the present disclosure will appreciate other cavitation techniques and devices that may be used in accordance with the methods of the present disclosure. In certain embodiments, multiple cavitation techniques (either the same or different) may be applied to the fluid in parallel or series.

In certain embodiments, additional methods for reducing the viscosity of the treatment fluid may also be utilized in addition to cavitating the fluid. Such additional methods include, but are not limited to, applying pressure and/or heat to the treatment fluid and adding chemical breakers to the treatment fluid. In such embodiments, chemical breakers may be added before, after, and/or during cavitation. In some embodiments, the chemical breaker may be ineffective in sufficiently breaking the polymers in the treatment fluid on its own. However, it may aid in breaking the polymers in the treatment fluid before, after, and/or during cavitation. In some embodiments, the cavitation may make the chemical breaker more effective. In some embodiments, the chemical breaker may not impact or impede the cavitation. In certain embodiments, the cavitation of the treatment fluid may be performed at ambient temperature and/or pressure. In certain embodiments, other chemicals may be added to the fluid to aid in cavitating the fluid (e.g., through chemical oxidation). Examples of such chemical include ozone, carbon dioxide, oxygen, peroxides (e.g., hydrogen peroxide), nitric acid, sulfuric acid, peroxydisulfuric acid, peroxymonosulfuric acid, chlorite, chlorate, perchlorate, hypochlorite, pyridinium chlorochromate, permanganate compounds, perborate compounds, nitrous oxide, nitrogen dioxide, potassium nitrate, and any combination thereof. In certain embodiments, the methods of the present disclosure do not use ozone, carbon dioxide, and/or chemical oxidation in connection with the cavitation technique. In certain embodiments, ozone and/or carbon dioxide is not added to the fluid before or during cavitation.

In certain embodiments, the treatment fluid may be cavitated (e.g., exposed to one or more cavitation techniques) for a sufficient length of time to cause cavitation of the treatment fluid and/or achieve a desire reduction in the viscosity and/or suspension properties of the treatment fluid. In certain embodiments, the treatment fluid may be cavitated for a time in a range of about 1 second to about 10 minutes. In other embodiments, the treatment fluid may be cavitated for a time greater than about 10 minutes. Those of ordinary skill in the art having the benefit of the present disclosure will appreciate that the residence time for a given volume of the treatment fluid in the flow-through cavitation device would be dictated by the flow rate of the fluid. Those of ordinary skill in the art having the benefit of the present disclosure will appreciate that any volume of treatment fluid may be cavitated using the methods of the present disclosure and that the residence time in a cavitated device may be impacted by the volume of the fluid.

In certain embodiments, the treatment fluids may be cooled while the cavitation technique is applied to mitigate at least a portion of the heat generating during the cavitation. In certain embodiments, the treatment fluids may be allowed to sit static for a period of time after applying the cavitation technique to, among other reasons, allow the reduction in the viscosity and/or suspension properties of the fluid to occur and/or to allow the components in the fluid (e.g., bridging agents) to settle and/or separate from the base fluid.

In certain embodiments, the methods of the present disclosure also may include the use of one or more separation or removal techniques on the treatment fluids to separate the base fluid (e.g., brine) from solid component of the fluid (e.g., lost circulation materials and bridging agents). Examples of techniques that may be suitable for removing or separating solid particulates from the treatment fluid in accordance with the methods of the present disclosure include, but are not limited to, settling, decantation, filtration, centrifugation, dissolution or dissolving (e.g., with acid), electrocoagulation, and any combination thereof. Those of ordinary skill in the art having the benefit of the present disclosure will appreciate that the separation or removal techniques used may depend on, among other things, the size of the solid particulates being removed or separated from the base fluid. In certain embodiments, the solid particulates may be large enough that filtration is not as desirable as other separation techniques (e.g., settling). In other embodiments, the solid particulates may be small enough that filtration is not as desirable as other separation techniques (e.g., dissolution or centrifugation). In certain embodiments, the methods of the present disclosure also may include the use of other separation techniques (e.g., distillation) to remove other components (e.g., salts) from the base fluid. Those of ordinary skill in the art having the benefit of the present disclosure will appreciate other separation or removal techniques that may be used in accordance with the methods of this disclosure.

In certain embodiments, the base fluid (e.g., brine) of the treatment fluid may be recovered following the cavitation technique(s) and/or the separation or removal technique(s). In such embodiments, the recovered base fluid may be recycled or reused. For example, in certain embodiments, the recovered base fluid may be introduced into a subterranean formation and/or a wellbore penetrating a subterranean formation. In such embodiments, additional additives, such as those disclosed herein, may be added to the recovered base fluid before it is introduced into the subterranean formation and/or the wellbore. In some embodiments, the recovered base fluid may be blended with a fresh based fluid (e.g., a fluid that has not yet been used to treat a subterranean formation) before it is introduced into the subterranean formation and/or the wellbore. In such embodiments, less polymer may be needed in the fresh based fluid because of the polymer remaining in the reclaimed base fluid.

Some embodiments of the present disclosure provide methods for using the disclosed treatment fluids to carry out a variety of subterranean treatments, including but not limited to, drilling. The drilling and/or drill-in fluids disclosed herein may directly or indirectly affect one or more components or pieces of equipment associated with the preparation, delivery, recapture, recycling, reuse, and/or disposal of the drilling and/or drill-in fluids. For example, and with reference to FIG. 1, the drilling and/or drill-in fluids disclosed herein may directly or indirectly affect one or more components or pieces of equipment associated with a wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates a drilling and/or drill-in fluid 122 of the present disclosure through a feed pipe 124 and to the kelly 110, which conveys the drilling and/or drill-in fluid 122 downhole through the interior of the drill string 108 and through one or more orifices in the drill bit 114. The drilling and/or drill-in fluid 122 may then circulated back to the surface via an annulus 126 defined between the drill string 108 and the walls of the borehole 116. At the surface, one or more fluid processing unit(s) 128 via an interconnecting flow line 130. After passing through the fluid processing unit(s) 128, a "cleaned" drilling and/or drill-in fluid 122 is deposited into a nearby retention pit 132 (i.e., a mud pit). In certain embodiments, the cavitation technique(s) and/or the separation or removal technique(s) disclose herein may be performed in the fluid processing unit(s) 128.

Figure 2:
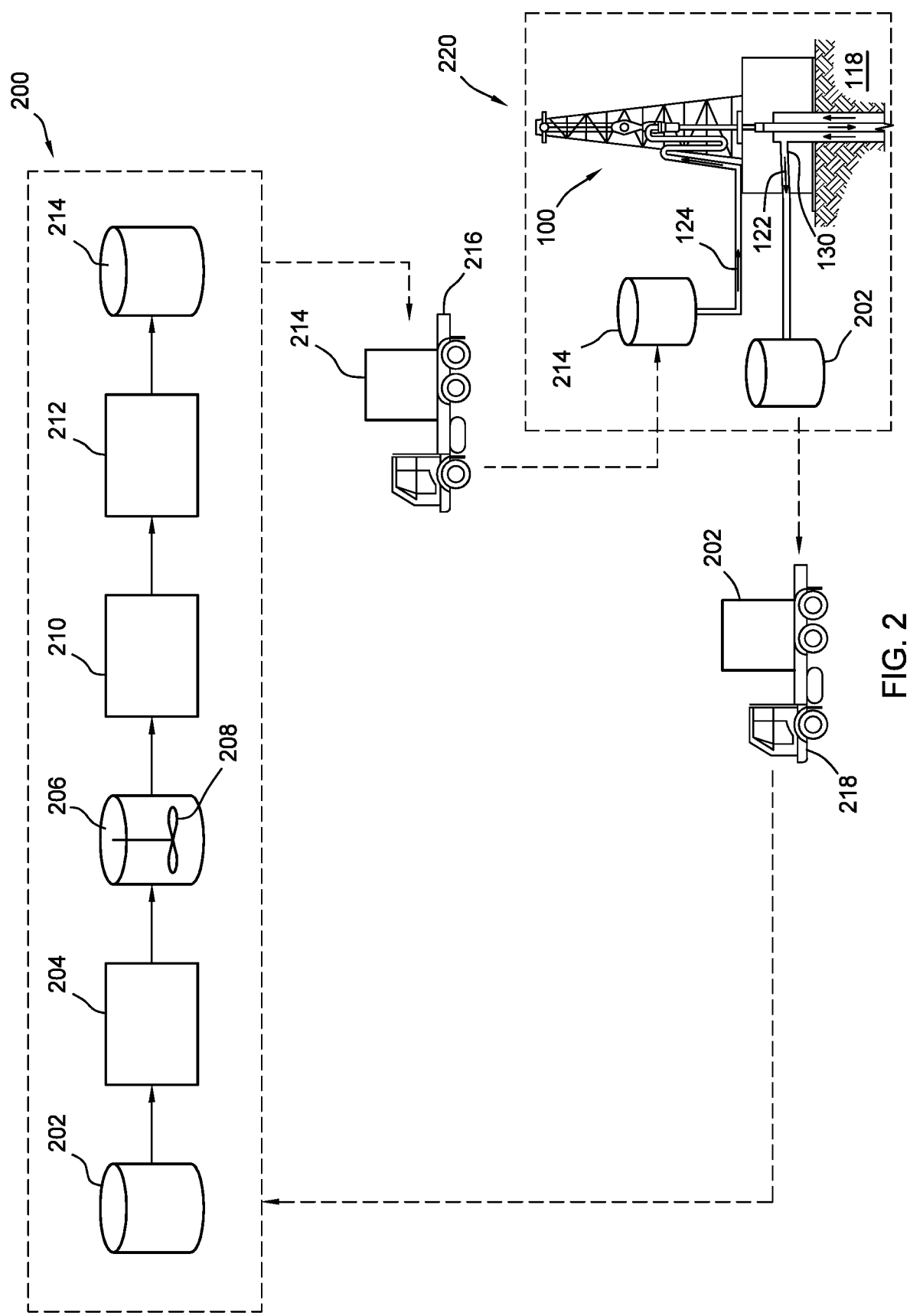
FIG. 2 is a diagram illustrating an example of a fluid processing operation that may be used in accordance with certain embodiments of the present disclosure.

While illustrated in FIG. 1 as being arranged at the outlet of the wellbore 116 via the annulus 126, those skilled in the art will readily appreciate that the fluid processing unit(s) 128 may be arranged at any other location in the drilling assembly 100, any other wellsite location, or an off-site location to facilitate its proper function, without departing from the scope of the disclosure. For example, as shown in FIG. 2, in certain embodiments, the spent drilling and/or drill-in fluid 122 may be transported to an off-site location 200 from the wellsite 220. In such embodiments, the spent drilling and/or drill-in fluid 122 exits the annulus 126 and may be conveyed to one or more tanks or vessels 202. The tanks or vessels 202 may be loaded onto a truck 218 and transported to the off-site location 200 for processing in accordance with the methods of the present disclosure. In certain embodiments, the spent drilling and/or drill-in fluid 122 may be transferred from the tanks or vessels 202 to a cavitation device 204 disclosed herein. Although not pictured, depending upon the cavitation technique utilized in accordance with the methods of the present disclosure, the cavitation device 204 may instead be added to the tanks or vessels 202. In some embodiments, the spent drilling and/or drill-in fluid 122 may be stored at the off-site location 200 in the tanks or vessels 202 (or another tank or vessel) for a period of time (e.g., from about a week to about a year or more) prior contacting the fluid 122 with the cavitation device 204.

In some embodiments, a precipitant may optionally be added to the spent drilling and/or drill-in fluid 122 to further "clean" the fluid. In such embodiments, the precipitant may be allowed to form a precipitate with at least a portion of the polymer in the spent drilling and/or drill-in fluid 122. As shown in FIG. 2, the spent drilling and/or drill-in fluid 122 may be transferred from the cavitation device to a tank 206. In some embodiments, the tank 206 may be a mixing tank and may contain a mixing device 208 (e.g., impeller, agitator, stirring rod, jet). Although not pictured, in some embodiments, the precipitant may be added to the spent drilling and/or drill-in fluid 122 in the tank or vessel 202 or in the cavitation device 204 instead of utilizing the tank 206. In certain embodiments, after the precipitant is allowed to form a precipitate with at least a portion of the polymer to the spent drilling and/or drill-in fluid 122, the fluid may be transferred to a separation apparatus 210 (e.g., a settler, a decanter, a filter, a centrifuge, a tank) to remove at least a portion of the precipitate. As noted above, the use of a precipitant is optional. Thus, in some embodiments, a precipitant may not be used to further "clean" the fluid the spent drilling and/or drill-in fluid 122. In such embodiments, neither tank 206 nor separation apparatus 210 would be required and the spent drilling and/or drill-in fluid 122 may be transferred from cavitation device 204 to a separation or removal apparatus 212.

In certain embodiments, the spent drilling and/or drill-in fluid 122 with the polymer at least partially broken (and optionally removed following precipitation with the precipitate) may then be transferred to a separation or removal apparatus 212 (e.g., a settler, a decanter, a filter, a centrifuge, a tank), as discussed above, to remove at least a portion of the solid particulates (e.g., lost circulation materials and bridging agents) in the fluid. Although not pictured, in other embodiments, the spent drilling and/or drill-in fluid 122 may be transferred to a separation or removal apparatus 212 to remove at least a portion of the solid particulates in the fluid prior to the application of the cavitation technique. The final "cleaned" drilling and/or drill-in fluid (e.g., the aqueous base fluid) may be stored in one or more tanks or vessels 214 for a period of time (e.g., from about a week to about a year or more) at the off-site location 200. The tanks or vessels 214 may be loaded onto a truck 216 and transported to back to the wellsite 220, which may be the same wellsite from which the spent drilling and/or drill-in fluid 122 was taken or a different wellsite.

Returning back to FIG. 1, once the cleaned fluid is back at the wellsite, one or more components disclosed herein (e.g., viscosifiers, lost circulation materials, and bridging agents) may be added to the "cleaned" drilling and/or drill-in fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the components may be added to the drilling and/or drill-in fluid 122 at any other location in the drilling assembly 100, any other wellsite location, or an off-site location to facilitate its proper function. In at least one embodiment, for example, there could be more than one retention pit 132, such as multiple retention pits 132 in series. Moreover, the retention pit 132 may be representative of one or more fluid storage facilities and/or units where the drilling and/or drill-in fluid 122 or any component thereof (e.g., base fluid or brine) may be stored, reconditioned, and/or regulated until recycled or reused.

As mentioned above, the drilling and/or drill-in fluid 122 of the present disclosure may directly or indirectly affect the components and equipment of the drilling assembly 100. For example, the disclosed drilling and/or drill-in fluid 122 may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a filter (e.g., diatomaceous earth filters), a heat exchanger, and/or any fluid reclamation equipment. The fluid processing unit(s) 128 may further include one or more sensors, gauges, pumps, compressors, and the like used to store, monitor, regulate, and/or recondition the drilling and/or drill-in fluid 122.

The drilling and/or drill-in fluid 122 of the present disclosure may directly or indirectly affect the pump 120, which representatively includes any conduits, pipelines, trucks, tubulars, and/or pipes used to fluidically convey the drilling and/or drill-in fluid 122 downhole, any pumps, compressors, or motors (e.g., topside or downhole) used to drive the drilling and/or drill-in fluid 122 into motion, any valves or related joints used to regulate the pressure or flow rate of the drilling and/or drill-in fluid 122, and any sensors (i.e., pressure, temperature, flow rate, etc.), gauges, and/or combinations thereof, and the like. The disclosed drilling and/or drill-in fluid 122 may also directly or indirectly affect the mixing hopper 134 and the retention pit 132 and their assorted variations.

The drilling and/or drill-in fluid 122 of the present disclosure may also directly or indirectly affect the various downhole equipment and tools that may come into contact with the drilling and/or drill-in fluid 122 such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed drilling and/or drill-in fluid 122 may also directly or indirectly affect any downhole heat exchangers, valves and corresponding actuation devices, tool seals, packers and other wellbore isolation devices or components, and the like associated with the wellbore 116. The disclosed drilling and/or drill-in fluid 122 may also directly or indirectly affect the drill bit 114, which may include, but is not limited to, roller cone bits, PDC bits, natural diamond bits, any hole openers, reamers, coring bits, etc.

While not specifically illustrated herein, the drilling and/or drill-in fluid 122 of the present disclosure may also directly or indirectly affect any transport or delivery equipment used to convey the drilling and/or drill-in fluid 122 to the drilling assembly 100 such as, for example, any transport vessels, conduits, pipelines, trucks, tubulars, and/or pipes used to fluidically move the drilling and/or drill-in fluid 122 from one location to another, any pumps, compressors, or motors used to drive the drilling and/or drill-in fluid 122 into motion, any valves or related joints used to regulate the pressure or flow rate of the drilling and/or drill-in fluid 122, and any sensors (i.e., pressure and temperature), gauges, and/or combinations thereof, and the like.

An embodiment of the present disclosure is a method including: providing a treatment fluid comprising a base fluid, at least one polymer, and one or more solid particulates; applying a cavitation technique to at least a portion of the treatment fluid; and separating or removing at least a portion of the solid particulates from the treatment fluid using a separation or removal technique selected from the group consisting of: settling, decantation, centrifugation, dissolving, dissolution, and any combination thereof.

In one or more embodiments described in the preceding paragraph, wherein the one or more solid particulates are selected from the group consisting of: a bridging agent, a lost circulation material, and any combination thereof. In one or more embodiments described in the preceding paragraph, adding one or more additives to the treatment fluid after the portion of the solid particulates has been separated or removed to form a second treatment fluid; and introducing the second treatment fluid into at least a portion of the subterranean formation. In one or more embodiments described in the preceding paragraph, wherein applying the cavitation technique to at least the portion of the treatment fluid comprises using a device selected from the group consisting of: a hydrodynamic cavitation device, a centrifugal pump, a marine propeller, a water turbine, an ultrasonic probe, an ultrasonic horn, an ultrasonic vibrator, an ultrasonic homogenizer, a flow-through sonication device, and any combination thereof. In one or more embodiments described in the preceding paragraph, wherein the polymer is selected from the group consisting of: poly(styrene-acrylate), poly(styrene-sulfonate), polyethylene, polypropylene, polyethylene glycol, polypropylene glycol, polyvinyl alcohol, polyvinylchloride, polyvinylpyrrolidone, poly(2-acrylamido-2-methyl-1-propanesulfonic acid), polyacrylate, partially hydrolyzed polyacrylate, polysulfone, poly(ethersulfone), polyetherimide, poly(phenylene sulfide), polyetheretherketone, polyether ketones, a fluoropolymer, any derivative thereof, and any combination thereof. In one or more embodiments described in the preceding paragraph, wherein applying the cavitation technique does not substantially alter a moisture content of the treatment fluid.

An embodiment of the present disclosure is a method including: providing a treatment fluid comprising a brine and a polymer selected from the group consisting of: poly(styrene-acrylate), poly(styrene-sulfonate), polyethylene, polypropylene, polyethylene glycol, polypropylene glycol, polyvinyl alcohol, polyvinylchloride, polyvinylpyrrolidone, poly(2-acrylamido-2-methyl-1-propanesulfonic acid), polyacrylate, partially hydrolyzed polyacrylate, polysulfone, poly(ethersulfone), polyetherimide, poly(phenylene sulfide), polyetheretherketone, polyether ketones, a fluoropolymer, any derivative thereof, and any combination thereof, wherein the treatment fluid was used to treat at least a portion of a subterranean formation, and wherein the treatment fluid has a first density from about 7 lb/gal to about 18 lb/gal; and applying a cavitation technique to at least a portion of the treatment fluid.

In one or more embodiments described in the preceding paragraph, wherein the treatment fluid has a second density after applying the cavitation technique that is from about 90% to about 100% of the first density. In one or more embodiments described in the preceding paragraph, wherein the polymer has a molecular weight equal to or greater than about 30,000 g/mol. In one or more embodiments described in the preceding paragraph, wherein applying the cavitation technique to at least the portion of the treatment fluid comprises using a device selected from the group consisting of: a hydrodynamic cavitation device, a centrifugal pump, a marine propeller, a water turbine, an ultrasonic probe, an ultrasonic horn, an ultrasonic vibrator, an ultrasonic homogenizer, a flow-through sonication device, and any combination thereof. In one or more embodiments described in the preceding paragraph, wherein applying the cavitation technique does not substantially alter a moisture content of the treatment fluid. In one or more embodiments described in the preceding paragraph, wherein the treatment fluid further comprises one or more solid particulates, and wherein the method further comprises separating or removing at least a portion of the solid particulates from the treatment fluid. In one or more embodiments described in the preceding paragraph, wherein the portion of the solid particulates is separated or removed from the base fluid using a separation or removal technique selected from the group consisting of: settling, decantation, filtration, centrifugation, dissolving, dissolution, and any combination thereof.

An embodiment of the present disclosure is a method including: providing a treatment fluid comprising a base fluid and a polymer, wherein the treatment fluid was recovered from at least a portion of a subterranean formation located at a wellsite; transporting the treatment fluid from the wellsite to an off-site location; and applying a cavitation technique to at least a portion of the treatment fluid at the off-site location.

In one or more embodiments described in the preceding paragraph, wherein applying the cavitation technique to at least the portion of the treatment fluid comprises using a device selected from the group consisting of: a hydrodynamic cavitation device, a centrifugal pump, a marine propeller, a water turbine, an ultrasonic probe, an ultrasonic horn, an ultrasonic vibrator, an ultrasonic homogenizer, a flow-through sonication device, and any combination thereof. In one or more embodiments described in the preceding paragraph, storing the treatment fluid at the off-site location. In one or more embodiments described in the preceding paragraph, wherein the treatment fluid further comprises one or more solid particulates, and wherein the method further comprises separating or removing at least a portion of the solid particulates from the treatment fluid using a separation or removal technique selected from the group consisting of: settling, decantation, filtration, centrifugation, dissolving, dissolution, and any combination thereof. In one or more embodiments described in the preceding paragraph, wherein the portion of the solid particulates is separated or removed at the off-site location. In one or more embodiments described in the preceding paragraph, adding one or more additives to the treatment fluid after the portion of the solid particulates has been separated or removed to form a second treatment fluid; and introducing the second treatment fluid into at least a portion of the subterranean formation. In one or more embodiments described in the preceding paragraph, wherein the additives are added to the treatment fluid at the off-site location.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those of ordinary skill in the art having the benefit of the teachings herein. While numerous changes may be made by those of ordinary skill in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
   providing a treatment fluid comprising a base fluid, at least one polymer, and one or more solid particulates, wherein the at least one polymer is selected from the group consisting of: guar, hydroxyethyl guar, hydroxypropyl guar, carboxymethyl guar, carboxymethylhydroxyethyl guar, carboxymethylhydroxypropyl guar, cellulose, hydroxyethyl cellulose, carboxyethylcellulose, carboxymethylcellulose, carboxymethylhydroxyethylcellulose, xanthan, scleroglucan, diutan, welan gum, alginate, starch, carboxymethyl starch, poly(styrene-butadiene), poly(styrene-acrylate), poly(styrene-sulfonate), polyethylene, polypropylene, polyethylene glycol, polypropylene glycol, polyvinyl alcohol, polyvinylchloride, polyvinylpyrrolidone, poly(2-acrylamido-2-methyl-1-propanesulfonic acid), polyacrylate, partially hydrolyzed polyacrylate, polysulfone, poly(ethersulfone), polyetherimide, poly(phenylene sulfide), polyetheretherketone, polyether ketones, a fluoropolymer, any derivative thereof, and any combination thereof;
   applying a cavitation technique to the treatment fluid to break the at least one polymer thereby reducing a viscosity of the treatment fluid, wherein the cavitation technique is applied to the treatment fluid outside of a wellbore penetrating a subterranean formation; and
   separating or removing at least a portion of the one or more solid particulates from the treatment fluid using a separation or removal technique selected from the group consisting of: settling, decantation, centrifugation, dissolving, dissolution, and any combination thereof.

2. The method of claim 1, wherein the one or more solid particulates are selected from the group consisting of: a bridging agent, a lost circulation material, and any combination thereof.

3. The method of claim 1 further comprising:
   adding one or more additives to the treatment fluid after the portion of the one or more solid particulates has been separated or removed to form a second treatment fluid; and
   introducing the second treatment fluid into at least a portion of a subterranean formation.

4. The method of claim 1, wherein applying the cavitation technique to the treatment fluid comprises using a device selected from the group consisting of: a hydrodynamic cavitation device, a centrifugal pump, a marine propeller, a water turbine, an ultrasonic probe, an ultrasonic horn, an ultrasonic vibrator, an ultrasonic homogenizer, a flow-through sonication device, and any combination thereof.

5. The method of claim 1, wherein applying the cavitation technique does not substantially alter a moisture content of the treatment fluid.

6. A method comprising:
   providing a treatment fluid comprising a brine and a polymer selected from the group consisting of: poly(styrene-acrylate), poly(styrene-sulfonate), polyethylene, polypropylene, polyvinyl alcohol, polyvinylchloride, polyvinylpyrrolidone, poly(2-acrylamido-2-methyl-1-propanesulfonic acid), polyacrylate, partially hydrolyzed polyacrylate, a fluoropolymer, any derivative thereof, and any combination thereof, wherein the treatment fluid was used to treat at least a portion of a subterranean formation, and wherein the treatment fluid has a first density from about 7 lb/gal to about 18 lb/gal; and
   applying a cavitation technique to at least a portion of the treatment fluid, wherein the cavitation technique induces cavitation in the portion of the treatment fluid, and wherein the cavitation technique is applied to the portion of the treatment fluid outside of the subterranean formation.

7. The method of claim 6, wherein the treatment fluid has a second density after applying the cavitation technique that is from about 90% to about 100% of the first density.

8. The method of claim 6, wherein the polymer has a molecular weight equal to or greater than about 30,000 g/mol.

9. The method of claim 6, wherein applying the cavitation technique to at least the portion of the treatment fluid comprises using a device selected from the group consisting of: a hydrodynamic cavitation device, a centrifugal pump, a marine propeller, a water turbine, an ultrasonic probe, an ultrasonic horn, an ultrasonic vibrator, an ultrasonic homogenizer, a flow-through sonication device, and any combination thereof.

10. The method of claim 6, wherein applying the cavitation technique does not substantially alter a moisture content of the treatment fluid.

11. The method of claim 6, wherein the treatment fluid further comprises one or more solid particulates, and wherein the method further comprises separating or removing at least a portion of the one or more solid particulates from the treatment fluid.

12. The method of claim 11, wherein the portion of the one or more solid particulates is separated or removed from the treatment fluid using a separation or removal technique selected from the group consisting of: settling, decantation, filtration, centrifugation, dissolving, dissolution, and any combination thereof.

13. A method comprising:
providing at least a portion of a treatment fluid comprising a base fluid and a polymer having a molecular weight equal to or greater than about 30,000 g/mol, wherein the treatment fluid was recovered from a subterranean formation located at a wellsite;
transporting the treatment fluid from the wellsite to an off-site location;
applying a cavitation technique to the portion of the treatment fluid at the off-site location to break at least a portion of the polymer thereby reducing a viscosity of the portion of the treatment fluid,
adding one or more additives to the portion of the treatment fluid comprising the broken polymer to form a second treatment fluid; and
introducing the second treatment fluid into at least a portion of a second subterranean formation.

14. The method of claim 13, wherein applying the cavitation technique to at least the portion of the treatment fluid comprises using a device selected from the group consisting of: a hydrodynamic cavitation device, a centrifugal pump, a marine propeller, a water turbine, an ultrasonic probe, an ultrasonic horn, an ultrasonic vibrator, an ultrasonic homogenizer, a flow-through sonication device, and any combination thereof.

15. The method of claim 13 further comprising storing the treatment fluid at the off-site location.

16. The method of claim 13, wherein the treatment fluid further comprises one or more solid particulates, and wherein the method further comprises separating or removing at least a portion of the one or more solid particulates from the treatment fluid using a separation or removal technique selected from the group consisting of: settling, decantation, filtration, centrifugation, dissolving, dissolution, and any combination thereof.

17. The method of claim 16, wherein the portion of the one or more solid particulates is separated or removed at the off-site location.

18. The method of claim 13, wherein the one or more additives are added to the treatment fluid at the off-site location.

* * * * *